US 7,447,494 B2
Nov. 4, 2008

(12) United States Patent
Law et al.

(10) Patent No.: US 7,447,494 B2
(45) Date of Patent: Nov. 4, 2008

(54) SECURE WIRELESS AUTHORIZATION SYSTEM

(75) Inventors: Simon Law, Mississauga (CA); Pasan Hapuarachchi, Brampton (CA); Daniel Man Tse, Richmond Hill (CA); Jimmy Law, Mississauga (CA)

(73) Assignee: Xtreme Mobility, Inc. (CA)

( * ) Notice: Subject to any disclaimer, the term of this patent is extended or adjusted under 35 U.S.C. 154(b) by 490 days.

(21) Appl. No.: 11/053,160

(22) Filed: Feb. 7, 2005

(65) Prior Publication Data

US 2005/0184145 A1 Aug. 25, 2005

Related U.S. Application Data

(60) Provisional application No. 60/541,768, filed on Feb. 5, 2004.

(51) Int. Cl.
*H04M 1/66* (2006.01)
(52) U.S. Cl. .................. 455/410; 455/407; 455/558; 455/466; 455/419; 705/26; 705/72; 705/78; 235/380; 380/270; 713/168; 379/91.01
(58) Field of Classification Search .......... 455/410–411, 455/405–408, 558; 235/380; 705/1, 44, 705/26, 72, 78; 379/114.1, 91.01; 380/270; 713/168
See application file for complete search history.

(56) References Cited

U.S. PATENT DOCUMENTS

| | | | |
|---|---|---|---|
| 5,706,330 A * | 1/1998 | Bufferd et al. ............... 455/405 |
| 5,991,413 A * | 11/1999 | Arditti et al. .................. 705/77 |
| 6,052,675 A * | 4/2000 | Checchio ..................... 705/44 |
| 6,195,542 B1 * | 2/2001 | Griffith ........................ 455/406 |
| 6,332,135 B1 * | 12/2001 | Conklin et al. ................ 705/80 |
| 6,363,488 B1 * | 3/2002 | Ginter et al. ................... 726/1 |
| 6,650,887 B2 * | 11/2003 | McGregor et al. .......... 455/406 |
| 6,807,410 B1 * | 10/2004 | Pailles et al. ................ 455/407 |
| 6,868,391 B1 * | 3/2005 | Hultgren ...................... 705/26 |
| 6,978,380 B1 * | 12/2005 | Husain et al. .................. 726/4 |
| 6,980,796 B1 * | 12/2005 | Cuellar et al. ............... 455/410 |
| 7,016,875 B1 * | 3/2006 | Steele et al. .................. 705/44 |
| 7,146,159 B1 * | 12/2006 | Zhu ........................... 455/414.1 |
| 7,184,747 B2 * | 2/2007 | Bogat ......................... 455/406 |
| 7,209,890 B1 * | 4/2007 | Peon et al. .................... 705/17 |
| 7,343,174 B2 * | 3/2008 | Suryanarayana et al. . 455/553.1 |
| 2002/0147658 A1 * | 10/2002 | Kwan ........................... 705/26 |
| 2004/0122685 A1 * | 6/2004 | Bunce ........................... 705/1 |
| 2004/0159700 A1 * | 8/2004 | Khan et al. .................. 235/380 |
| 2004/0176071 A1 * | 9/2004 | Gehrmann et al. .......... 455/411 |

* cited by examiner

*Primary Examiner*—Sharad Rampuria
(74) *Attorney, Agent, or Firm*—Morland C. Fischer

(57) ABSTRACT

The invention relates to a secure wireless authorization system by which a user can employ a wireless device to authorize a request that is initiated by a remote third party and transmitted to the user by an authorization server. The system includes the authorization server that is linked to the third party by way of a communications connection and a wireless device that is adapted to securely store an encryption scheme and create a secure authorization from the user in response to the third party request and has the ability to establish a secure wireless connection over which the secure authorization is transmitted from the user's wireless device to the authorization server. Pre-authorization, real-time authorization and post-authorization methods are disclosed by which user authorized transactions can be completed by way of the authorization system of this invention.

24 Claims, 6 Drawing Sheets

SECURE WIRELESS AUTHORIZATION SYSTEM

RELATED APPLICATIONS

This application claims the benefit of priority from U.S. Provisional Patent Application Ser. No. 60/541,768 filed Feb. 5, 2004 and entitled WIRELESS SECURE AUTHORIZATION SYSTEM.

BACKGROUND OF THE INVENTION

1. Field of the Invention

This invention pertains to a secure wireless authorization system. More specifically, this invention relates to a wireless application in which a user can utilize a wireless device to authorize a request sent by an authorization server and initiated by a third party entity. In particular, this invention provides a secure encryption algorithm and digital signature to ensure the security of the wireless channel during the authorization process.

2. Background Art

The popularity of wireless communication has increased exponentially over the past few years. Cellular phones, Personal Digital Assistants (PDA), and other wirelessly enabled devices have successfully penetrated and been adopted by the general consumer market. Individuals enjoy the convenience, flexibility and mobility of wireless devices as a means to facilitate communications when a conventional telephone line is not within reach or the individual is in an automobile, on foot, or in any other type of mobile environment.

Individuals also enjoy the benefits and convenience of having financial accounts, electronic money accounts, general services accounts, or any private or public services account entities, which facilitates their purchasing goods/services, saving money and accessing personal records.

In the case of personal accounts and records, such as an individual's credit record, current practices do not include provisions that allow the individual to control access or receive real-time notice that his records are being accessed and updated. A secure authorization notice would be helpful in preventing not only unauthorized access but would give the individual control over who is updating the account or record and the information that is updated. Mistakes and incorrect information on an individual's credit record would have dire consequences, since an individual's credit record is used to approve loan and credit applications. An individual can be prevented from buying a house, a car, obtaining a credit card, phone service, cellular service and/or other essential services due to the information on the individual's credit record. Minimizing unauthorized use and/or information wrongly updated and/or added to the individual's record would help prevent these undesired consequences as well as save both the time and resources needed to correct these mistakes.

In case of personal accounts and records such as an individual's health or government record, current practices do not include provisions that allow the individual to control access or receive real-time notice that the record is being accessed and updated. A secure authorization notice would be helpful in preventing unauthorized access and giving the individual control over who is updating the account or record and the information that is updated. Mistakes and incorrect information on an individual health or government record can have dire consequences. An individual may have benefits denied or have an inaccurate medical record leading to higher health insurance rates or leaving his privacy unprotected. Minimizing unauthorized use and/or information wrongly updated and/or added to the individual's record would help prevent these undesired consequences as well as save both the time and resources needed to correct these mistakes.

In the case of brokerage accounts, a secure authorization notice would inform the user that a particular stock transaction has taken place or advise that the price of a particular security has entered into a favorable range and query if the individual wants to take a specific action. This would give the individual greater flexibility and allow the individual to take advantage of trading opportunities that were not available without using a wireless device with a secure wireless connection.

In the case of services accounts such as a checking account, savings account, and/or cellular services account, allowing access and/or operations on the account through a secure wireless connection would allow an individual to initiate a balance inquiry, transfer value, and/or transfer time-units from one account to another. This would give the individual greater flexibility and find new uses for these accounts while allowing individuals and service providers to reap greater benefits from the increase in account usage.

Other uses, such as initiating the transfer of currency in real time from one financial account to another financial account allows the individual to draw funds against his own financial account and pay for goods and services by depositing the funds into an account of an individual or company that has provided the product or service immediately without having to undergo the inconvenience of first going to a specific institution or electronic banking facility to withdraw funds and/or use credit cards, charge cards, debit cards and/or write a check to settle a transaction.

In each case, the foregoing allows the individual to avoid having to undergo the inconvenience of going to a specific institution to access, authorize, and/or settle an account. In this regard, the ability of having a secure and highly encrypted wireless channel to enter into a transaction and/or access a personal record is crucial and critical.

Unfortunately, with the convenience and flexibility of each of the above services come opportunities for theft, fraud and/or abuse resulting in financial, identity, information and/or productivity loss. The information and/or account holder only becomes aware of the unauthorized access and/or usage of the information and/or account after the fact when a monthly account summary or notice is given. As a result, financial and identity information and/or productivity are lost directly and indirectly as the information and/or account holder tries to correct the theft, fraud and/or abuse.

In the case of credit cards, charge cards, and/or debit cards, theft, fraud and/or unauthorized usage has been estimated to be in the billions of dollars globally. Although the end user is not held responsible for any financial loss once the theft, fraud and/or unauthorized usage has been reported, this financial burden falls on the shoulders of merchants who pass on these extra costs ultimately in the form of higher prices to the consumer. Moreover, the reputation of the card issuer will be impacted if it is perceived that a particular type of card can be stolen and/or accessed more easily than others. A secure wireless authorization notice would be helpful in preventing theft, fraud and/or unauthorized usage of these cards by giving greater control to the individual, reducing theft and/or fraud costs to the merchants and enhancing the card issuer's card security reputation. It would also open new uses for these cards, allowing individuals, merchants and card issuers to reap greater benefits from their card usage.

Although current practices exist to prevent and deter fraud, such practices do not keep up with the pace of technology change. In addition, new channels are being created from this technology change that allows individuals to respond wirelessly to a request using secure/high encryption from an entity to access information and transfer currency that was not possible before. Therefore, there is an urgent need for a secure transaction environment to thwart the fraudulent activities in each of the above services.

U.S. Patent Application Publication No. 2002/0082995 to Christie describes a payment authorization system for credit card use. It describes an additional authorization process by sending an authorization request from a processing center to a device upon receiving the request. However, the system only applies to real-time processing but does not address the operation procedure when there is no response from the user. Moreover, there is no detailed description on security schemes such as encryption of the transaction data, and/or a requirement of the user to enter a personal identification number (PIN) or a personal digital signature. Without secure/high encryption, the system becomes very vulnerable to fraud and could potentially result in uncountable financial loss. Also, the system is designed for credit transactions and does not consider other potential uses for wireless authorization system.

Other methods for authorization have been proposed. For example, U.S. Patent Application Publication No. 2001/0051920 to Joao, et al. describes an authorization/notification system for financial transactions. U.S. Patent Application Publication No. 2003/0061163 to Durfield describes a transaction verification system, where a transaction with a credit/debit card is authorized by both the user and the credit card company concurrently. The system described by Joao, et al. is similar to that described in U.S. Patent Publication No. 2003/0061163 listed above, except that the scope of the system is tapered towards credit/debit card transactions. However, both systems fail to incorporate secure transaction schemes, thus making the system prone to fraud and identity theft.

In addition, U.S. Pat. No. 6,052,675 to Cheechio describes a pre-authorization scheme for credit card or bank card transactions. However, this scheme is limited to pre-authorized transactions and thus thwarts the benefits of a real-time transaction. Also, the pre-authorization details are stored in the credit-card network. It would be better for the pre-authorization details to be stored with the credit card issuers as they have better visibility into the user's account limits and constraints. Also, it is impractical to request a user to enter the exact amount of a transaction cost as required in the patent disclosure.

SUMMARY OF THE INVENTION

This invention relates to a secure wireless authorization system allowing a user with a wireless device to authorize access of information and/or a transaction request initiated by a third party entity. In particular, this invention provides a secure/high encryption algorithm and digital signature to ensure the security of the wireless channel during the authorization process while increasing protection for theft and fraud.

The wireless authorization system is primarily comprised of a third party entity, an authorization server, and a user's wireless device. The third party is connected to the server through a wide access network. Communication between the user's wireless device and the authorization server is established through a secure wireless network by using an encryption key and/or a digital signature. Further, a database is linked to the authorization server to retain user information.

Three authorization models are disclosed herein, namely, a pre-authorization model, a real-time authorization model, and a post-authorization model. All models enable the setup of a secure channel between the wireless device and the authorization server. With the additional secure features, the authorization system would be very resistant to any malicious hacking and security attack. It also enhances the verification process for the response entity to ensure that the received signal is indeed sent by the targeted user. It also broadens the range of applications to any type of authorization and operation, such as credit card transaction authorization, medical record review authorization, financial transaction authorization, currency transfer operation and authorization, value-unit transfer and authorization, and identification access authorization.

In the pre-authorization model, a user pre-authorizes a transaction in anticipation of a request by a third party. First the user specifies transaction information and sends it to the authorization server. The information can include the third party name, the amount of transaction, and the expiry date of the pre-authorization. Later on when a transaction request is sent out by the third party to the authorization server, the transaction information will be processed. If verified to be valid, the transaction will be approved without user intervention.

The real-time authorization model is different from the pre-authorization model such that it allows the user to receive instant notification and provide time critical response to either authorize or deny the third party's request. The transaction is placed in a pending state until the third party initiates a transaction request to the authorization server. The authorization server determines if the user and the third party have the right criteria. If the channel connecting the user and the authorization server is secure, the authorization server sends out an authorization request to the user's wireless device. The user either approves or denies the request along with a personal identification number (PIN) or personal digital signature. If the correct security credentials are provided, the response will be processed by the authorization server. An appropriate response will be sent back to the third party by the authorization server to complete the transaction.

The post-authorization model allows a user to authorize a transaction request after a timeout period has expired, such as, for example, if the authorization server is unable to establish a secure connection with the mobile device. When the user re-enters the operating zone or when the mobile device is turned back on, the stored messages is delivered to the wireless device through the message center. Upon receiving the response from the wireless device, the specified response will be executed by the authorization server and sent back to the third party, telling the authorization server the new change in status of a previously denied transaction.

The connections that are established between the authorization server and the user's wireless device in the pre-authorization, real-time authorization and post-authorization models are secured using encryption schemes. Two preferred methods of security schemes for use herein are symmetric-key encryption and public-key encryption.

It is therefore an object of the present invention to provide a wireless authorization system to authorize a request sent by a third party.

It is a further object of the present invention to provide a secure transaction by implementing secure/high encryption schemes, minimizing the possibility of identity theft and fraud and thereby avoiding the potential financial cost that could occur as a result thereof.

It is another object of the current invention to provide both the user, third party, and the entity owning the authorization center a greater sense of security and to discourage theft and fraudulent activities by making the authorization impossible to achieve without proper user's approval.

It is yet another object of the current invention to provide a simple system that is easy to implement and low in cost by employing a minimum number of hardware that is widely available to consumers.

DETAILED DESCRIPTION OF THE EMBODIMENT

Figure 1:
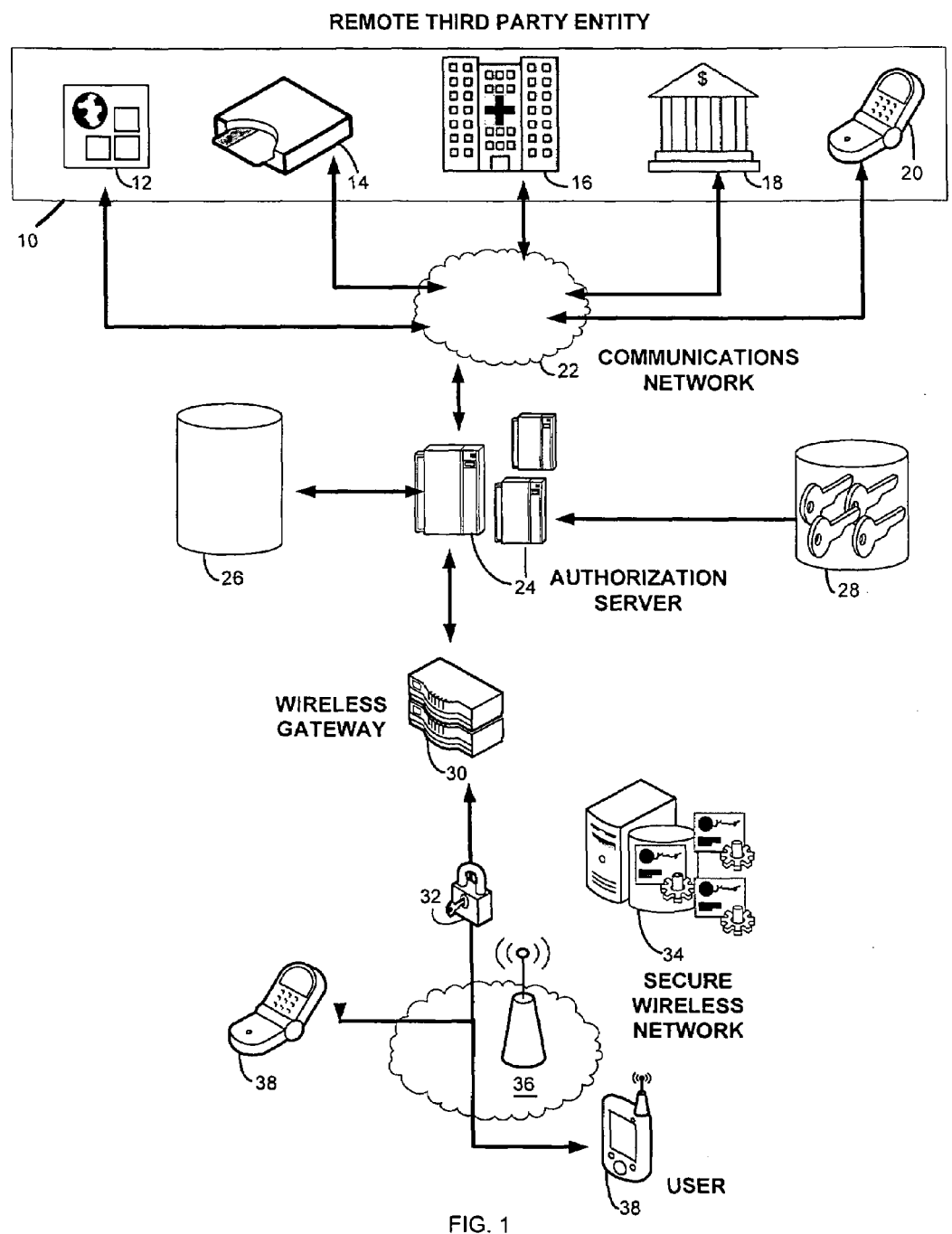
FIG. 1 is a schematic diagram to illustrate a secure wireless authorization system according to a preferred embodiment of this invention.

FIG. 1 is a schematic diagram to illustrate the preferred embodiment of this invention. It is primarily comprised of a third party entity 10, authorization server 24, and a user's wireless device 38. The purpose of the third party entity is to request an action that needs to be authorized by a user through their wireless device. For example, the third party entity can be an online merchant 12 requesting authorization of a credit card transaction from the issuing bank. The request will be initiated by the online merchant, sent through the credit card network 22 and into the authorization server 24 of the issuing bank. The third party entity can also be a retailer with a point of sale device or a credit card reader 14 which connects to the merchant or credit card network 22. Entity 18 represents a financial institution initiating the request. Entity 16 represents a medical institution initiating the request. It should be noted that the "third party" can also be understood as a separate application residing on the same server or a separate server residing within the same company or financial institution or individual. This is dependant on whether the requesting entity resides with the same financial institution or company as the authorizing user.

The wide access network 22 that is shown in FIG. 1 connects the third party entity with authorization server 24. The wide access network 22 can include other intermediate computer systems or processing units which will depend on the nature of the third party entity. For instance if the third party is another wireless device 20 the wide access network 22 shown in FIG. 1 would represent a wireless network.

The authorization server 24 described herein is the central processing entity of the system. This authorization server can include one or more servers or mainframes connected together to handle high volumes of traffic and processing. It is responsible for executing the required logic and procedure to obtain secure authorization from a user and his wireless device. In addition, it is also responsible for executing the third party request if and when the user does authorize the request. The actions to execute the third party request would typically be served by a separate application and server than the one used to obtain authorization.

The authorization server 24 includes a database 26 which stores the account information of the users they serve. The account information is used to associate the third party request with a particular user and their wireless device. The authorization server will also include the secure storage 28 of encryption keys and/or certificates used to create a secure connection with the wireless devices. Depending on which authorization model used, the server must also keep track of the global unique identifier (GUID) of the wireless device in order to be able to contact it.

The wireless gateway 30 is an entity that bridges the authorization server with the wireless network 36. It translates communication requests and information onto wireless network protocols that can be relayed to the wireless device. Typical wireless gateways are short message service centers (SMSC), multimedia message service centers (MMSC) and gateway GPRS (General Packet Radio Service) service nodes (GGSN). For instance, SMSC will package 140 bytes into a message that can be persistently received by the wireless device. The wireless device can also use SMS to return the message back to the authorization server through the SMSC. Alternatively, the system can use a packet base technology using the GGSN. Typically, GPRS would be used for connection-oriented connections while short message service/enhanced message service/multimedia message service (SMS/EMS/MMS) would be used for connectionless communication. The preferred embodiment contemplates a method to operate on either connection-oriented or connectionless protocols or both.

The wireless device 38 is an entity which has the ability to notify users of authorization requests and also provide an interface for the user to respond to the authorization request. The wireless device 38 must be computationally capable of creating an encrypted secure connection within a reasonable time. The wireless device must also be able to store an application that will process the request from the authorization server. This wireless application will be responsible for setting up the secure connection 32, securely storing certificates/encryption keys, displaying the request, accepting and creating the response. Typically the wireless device is a mobile cellular phone, a wirelessly enabled personal digital assistant (PDA), and/or a mobile cellular capable personal digital assistant such as a smart-phone.

There are three authorization models that can be used by the user and their wireless device to allow a third party to access information and or complete a financial transaction. All three models can operate individually, in a pair or in unison depending on the authorization scenario of the entire system. The three authorization models are pre-authorization, real-time authorization and post-authorization.

In the pre-authorization model the user can choose to pre-authorize a transaction in anticipation of a request by a third party. The user will enter in the transaction details and send it to the authorization server. Afterwards when a transaction request is sent out by the third party and verified by the authorization server, the transaction request is verified with the pre-authorized information. If confirmed, the transaction is approved by the server without further user intervention.

Figure 2:
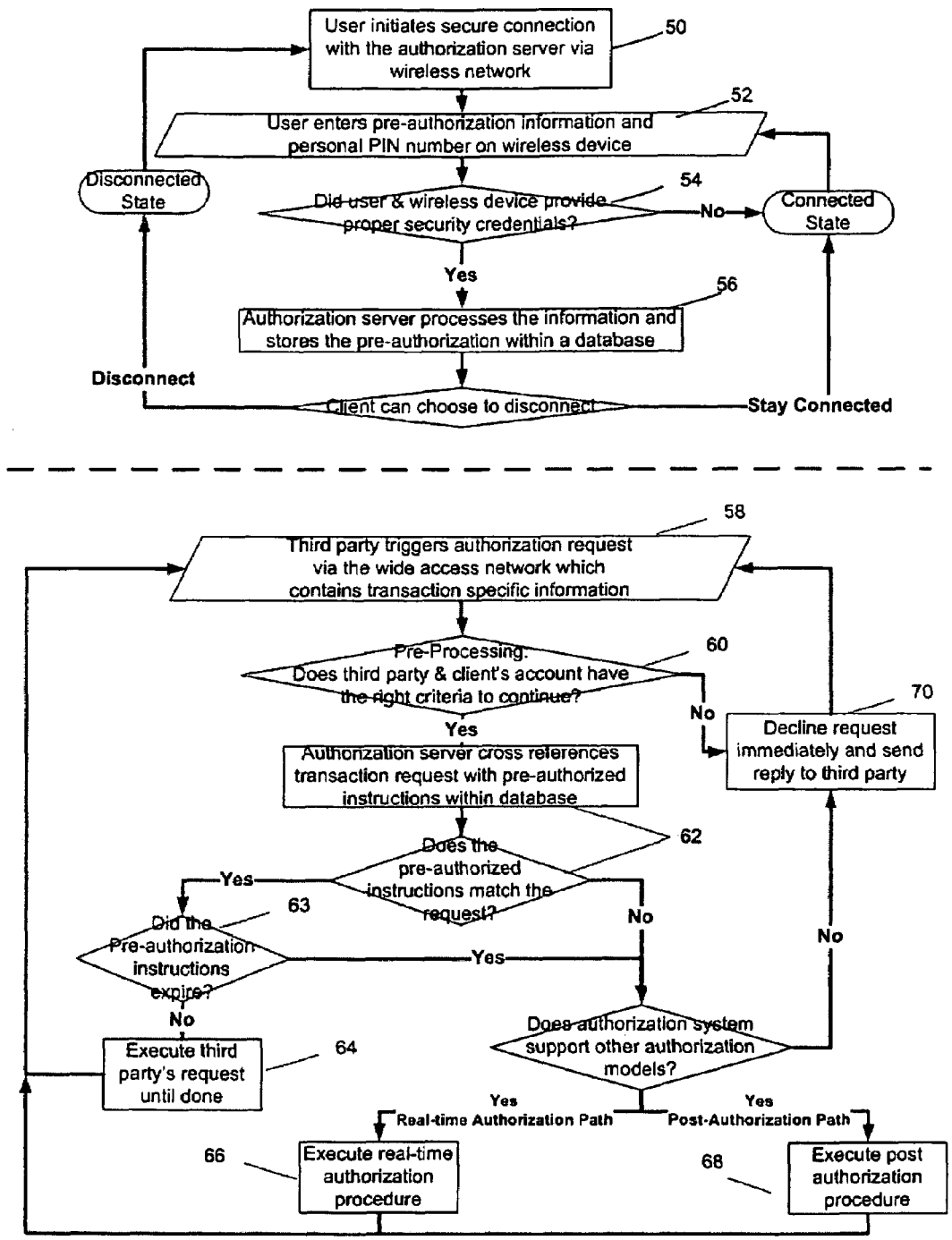
FIG. 2. is a flow diagram which illustrates the steps for a pre-authorization model.

FIG. 2 is a flow chart showing the pre-authorization model. For instance, company X requests action Y for the amount of Z from user W. During the pre-authorization procedure the user W will initiate the wireless device with the proper installed software to establish a secure connection with the authorization server via a wireless network (Block 50). The user W will enter information of X, Y and Z into the mobile device and also a PIN (Block 52). The set of pre-authorization information is sent to the authorization server through an encrypted secure channel connecting the mobile device and the authorization server. The authorization server will verify the user W's PIN and other security credentials (Block 54). If the information is correct, the set of pre-authorization information will be stored by the authorization server or by an alternative database server (Block 56).

When the third party initiates a transaction request (Block 58) through a wide access network (e.g., such as private networks, public networks, local area networks, wireless networks, Internet and/or a hybrid of these networks) to the authorization server, then the authorization server pre-processes the request to determine if it has the right criteria (Block 60). In the case of credit card authorization, the criteria could include validity of the credit card number, sufficient funds in the account, and possibility of non-fraudulent activities. If all the criteria are satisfied, the authorization server will retrieve the pre-authorized information and determine if the request and the pre-authorized instructions match (Block 62). If the information matches and the pre-authorization instructions has not expired (Block 63), the transaction is then executed by the authorization server and a confirmation is sent back to the third party (Block 64). Additional processing by the third party may be required to complete the transaction. An optional acknowledgement can also be sent back to the user's wireless device.

Alternatively, if the pre-authorized instructions do not match or the instructions have expired, the request can either be denied or the real-time (Block 66) and/or post-authorization models (Block 68) can be executed. Both models are further explained in real-time authorization and post-authorization sections respectively. If the authorization system does not support other models, then the request will be declined and the reply will be sent back to the third party (Block 70).

In the real-time authorization model, the user uses the wireless device to authorize a third party request in real-time. This will allow the user to receive instant notification and provide time critical instructions to either authorize or deny the third party's request. The transaction is placed in a pending state until the third party initiates a transaction request to the authorization server. The server sends out an authorization request to the user's wireless device. The approval response will be processed by the authorization server and the appropriate actions taken. Then an acknowledgement is sent back to the third party by the authorization server to complete the transaction.

Figure 3:
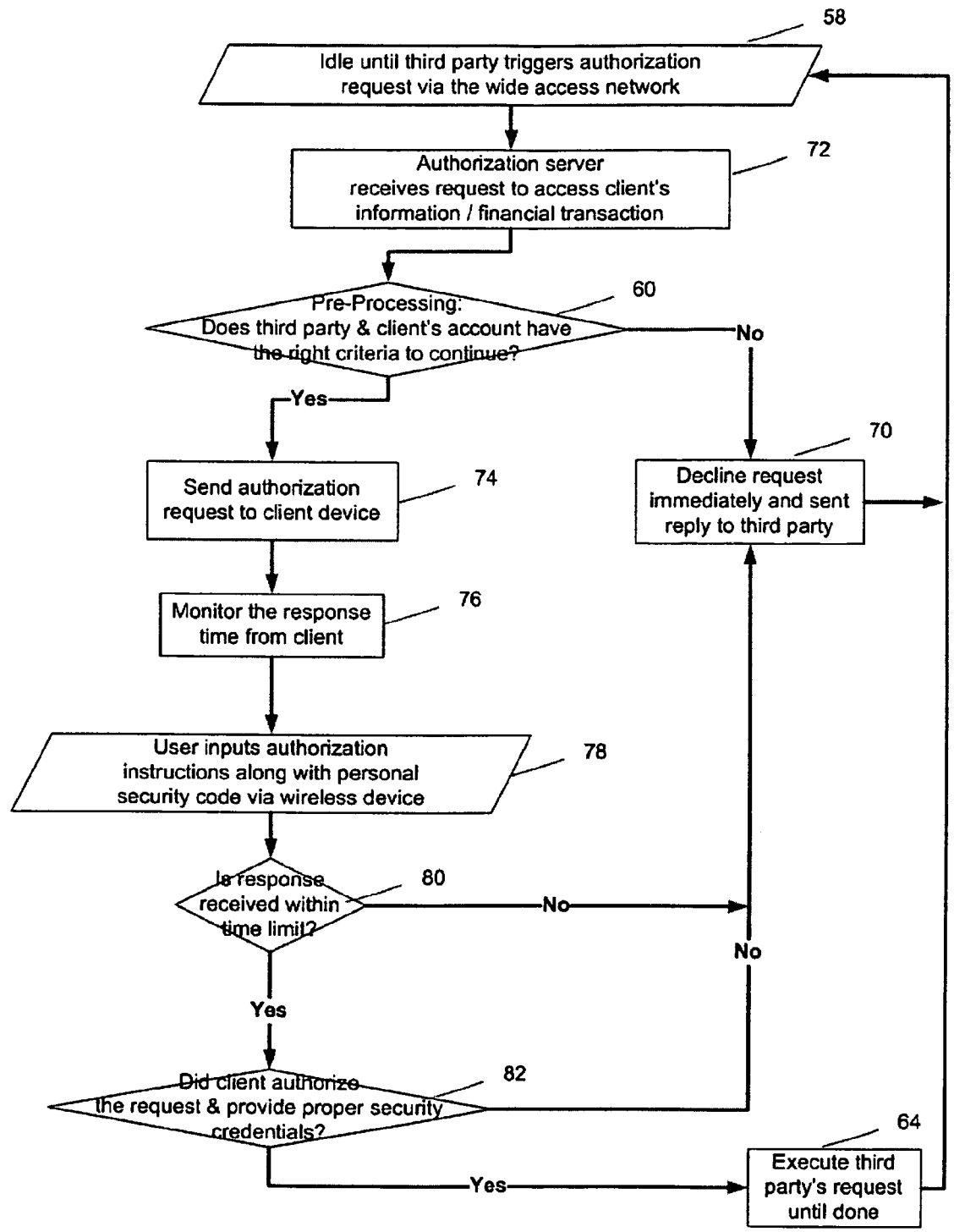
FIG. 3. is a flow diagram which illustrates the steps for a real-time authorization model.

FIG. 3 shows the flow chart for the basic real-time authorization model. The system is initiated when the third party sends an authorization request to the authorization server via the wide access network (Block 58). The request should contain at least one or more of the following parameters: third party identification, type of request, request parameters, and/or user identification. Upon receiving the request (Block 72), the authorization server will pre-process the information to determine if the user and the third party have the right criteria (Block 60). For instance, in credit card authorization, the criteria could include validity of the credit card number, sufficient funds in the account, and possibility of non-fraudulent activities. If pre-authorization has occurred, the authorization server will respond to the third party request immediately, without further user intervention as earlier described.

However if no valid pre-authorization exists, the server will send out an authorization request to the user's wireless device (Block 74) and start monitoring the response time from the user (Block 76). The request will travel through an encrypted secure channel connecting the authorization server and the user's wireless device. The specific details for establishing connections with a mobile phone are described below. Upon receiving the request, the wireless device will notify the user and automatically display the request for the user. A message similar to "company X requests action Y for an amount of Z, would you like to proceed?" would be displayed on the wireless device. The user will have the opportunity to input the response through the wireless device and be able to provide a PIN or personal digital signature (Block 78). This PIN or digital signature can be derived from alternative input sources as well, such as finger print scanner, digitized voice or other biometrics. The PIN or digital signature along with the appropriate response parameters are sent back to the authorization server through an encrypted secure channel via the wireless network. The secure channel used to respond to the request can be independent from the secure channel that was used to notify the wireless device. The wireless device can re-create another secure channel.

Upon receiving the response from the wireless device, the authorization server will check if the response was received within a specified timeout period (Block 80) and verify the security credentials of the user and the wireless device (Block 82). In the event that the user does not respond to the request within the specified time limit, the authorization server will respond to the third party with the appropriate response, either to deny the request or wait for the post-authorization model to take effect (Block 70). If the correct security credentials are provided, the specified instructions within the user's response will be executed by the authorization server. An appropriate response will be sent back to the third party to complete the transaction (Block 64). An optional acknowledgement can also be sent by the authorization server informing the user of the outcome of the request.

The post-authorization model allows a user to authorize a transaction request after the request has timed out. This situation arises when the user is unable to respond to the real-time request within the specified timeout period and/or the authorization server was unable to establish a secure connection with the user's wireless device 38 in order to provide it with the request. The post-authorization model may not be appropriate for use with strict real-time authorization systems and/or if it is dependant on whether the third party is capable of accepting a post approval after it has been denied. The post-authorization model may be more applicable in situations relating to information access, transfer of wireless minutes, and/or transfer of funds between mobile phone subscribers. Real-time situations such as real-time stock executions should not apply.

Figure 4:
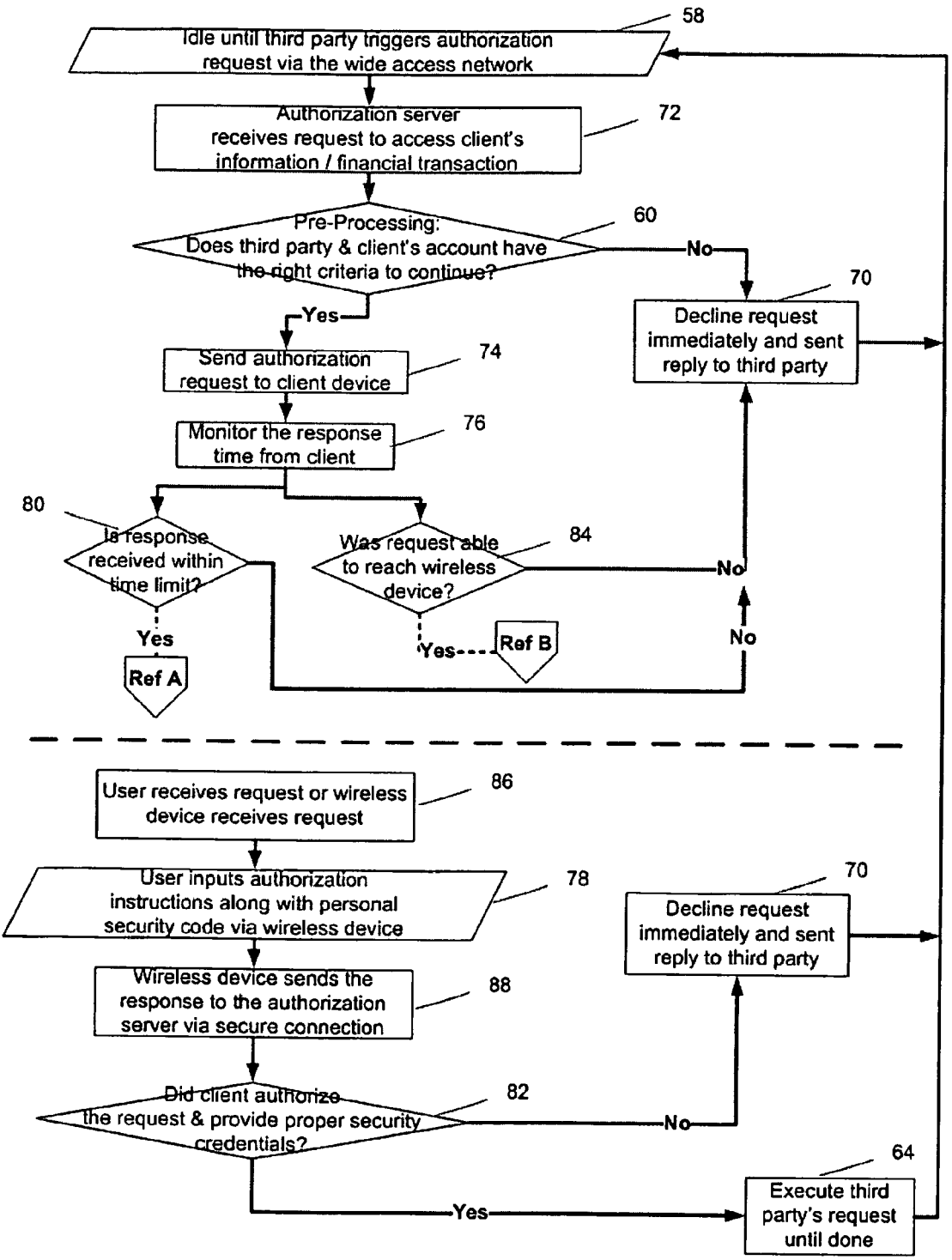
FIG. 4. is a flow diagram which illustrates the steps for a post-authorization model.

FIG. 4 shows the basic flow chart for the post-authorization model. It is similar in process to the real-time model except for the actions following the denial of the request from the authorization server. In the post-authorization model, the user would have missed the opportunity to respond to the real-time request from the authorization server. This might be due to the wireless device being out of the operating zone or the user not having the opportunity to input the response through his wireless device.

In the former case, the request sent out by the authorization server may be persistent or transient in nature. This will depend upon the underlining communication channel. For instance, short message service/enhanced message service/multimedia message service (SMS/EMS/MMS) has the option of delivering the message in a persistent manner by storing the messages through the message center and delivering it after the user has re-entered the operating zone or when the mobile device is turned back on (Block 86). This would give the user a chance to post-authorize the request. However, if the system uses a transient communication channel such as TCP/IP, the only possibility to authorize a request is to have the wireless network notify the authorization server to resend the request when the user's wireless device re-enters the operating zone or is turned back on.

When the user decides to respond to the request after the timeout period has expired, the process is similar to the real-time authorization procedure. Upon receiving the response from the wireless device (Block 88), the authorization server will verify the security credentials of the user and the wireless device (Block 82). If they are correct, the specified instructions within the user's response will be executed by the authorization server (Block 64). A response will be sent back to the third party, telling it of the new change in status of a previously denied transaction. The third party will act accordingly to the new change in status. An optional acknowledgement can also be sent by the authorization server informing the user of the outcome of the request.

To establish a connection between the authorization server and the user's wireless device, either the wireless device 38 initiates the connection to the authorization server 24 or the authorization server 24 initiates the connection to the wireless device 38. It is more difficult for the authorization server to initiate contact with the wireless device because the global unique identifier (GUID) for a wireless device may change as it moves from one network to another network or it can periodically change within the same network. For example, the IP address for a wireless device on a cellular network is constantly being rotated. On the other hand the unique identifier for the authorization server would rarely change, making it easier for the wireless device to contact the server.

For the real-time authorization model of FIG. 3, the authorization server 24 must have the ability to communicate the request in real-time to the wireless device 38. This can be achieved by first having the wireless device 38 create a connection-oriented connection to the authorization server 24. This connection can be accomplished automatically when the wireless application is initiated during start up or it can be manually started by the user. The established connection-oriented channel would allow the authorization server 24 to use it for sending the request.

One example of a connection-oriented channel would be TCP/IP. Many wireless networks such as General Packet Radio Service (GPRS) or 1X Radio Transmission Technology (1XRTT) provide TCP/IP or a simulated version thereof. A connection-oriented channel would provide connection status to the connected entities. If for some reason the connection was severed because the wireless device has migrated out of the operating zone and/or the wireless device loses its wireless signal, the application will attempt to recreate the connection in anticipation of the request from the authorization server. In situations where the user can anticipate a third party request, such as for retail transactions, the user can manually initiate the connection just before the authorization server sends out the request.

Figure 5:
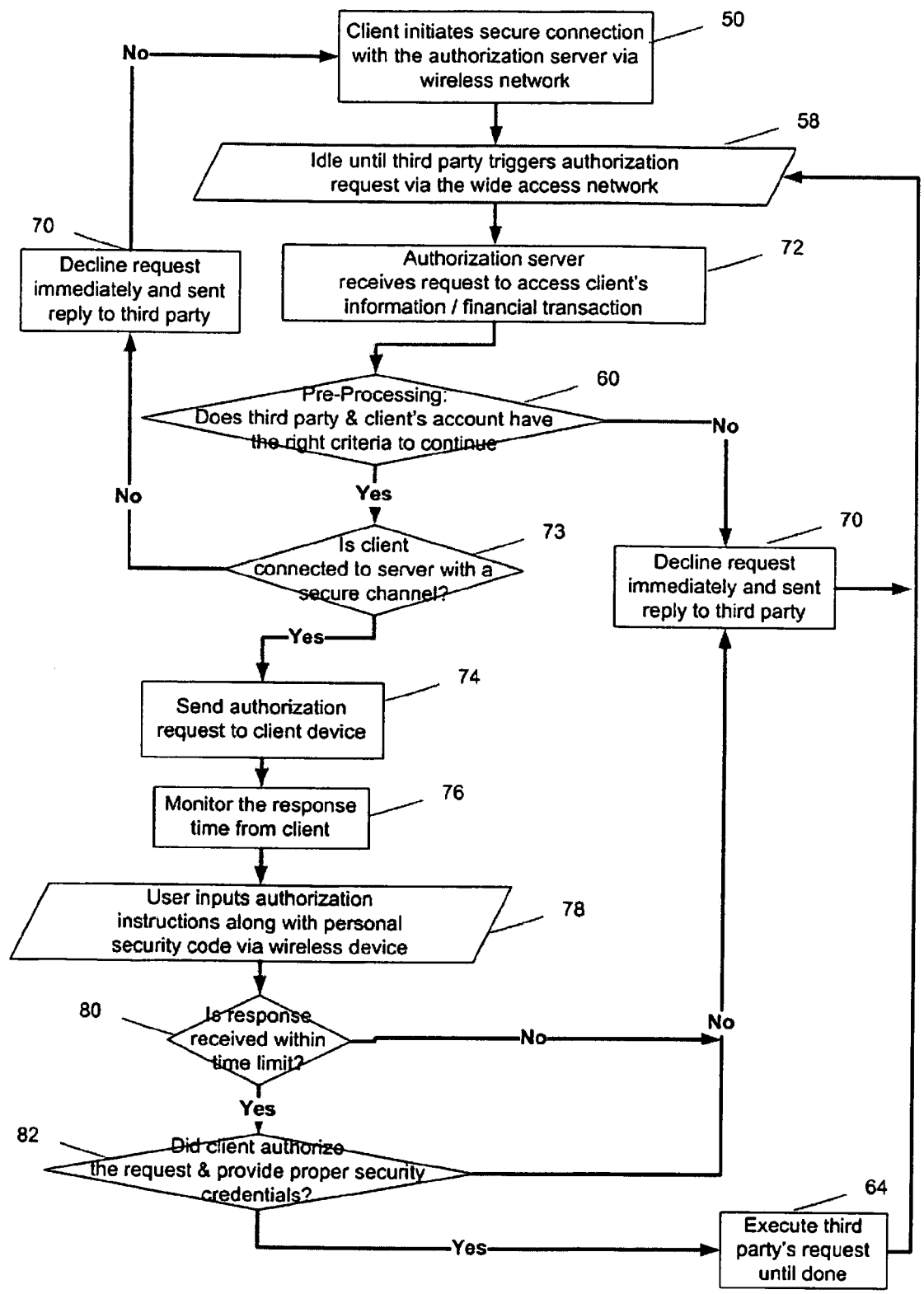
FIG. 5 is a flow diagram which illustrates the steps for a client initiated real-time authorization model.

FIG. 5 shows the flow diagram of the real-time authorization model with the wireless device 38 initiating the connection-oriented connection. This model is similar to the basic real-time authorization model of FIG. 3, except that it requires the user to initiate a secure wireless connection prior to the third party's request (Block 50). When the third party sends an authorization request to the authorization server via the wide access network (Block 58), the request is received by the authorization server 24 (Block 72). The authorization server will pre-process the information to determine if the user and the third party have the right criteria (Block 60). If pre-authorization has occurred, the authorization server will respond to the third party request immediately, without further user intervention as described earlier. However if no valid pre-authorization exists, the authorization server will check whether the channel connecting the user and the server is secure (Block 73). If so, the server will send out an authorization request to the user's wireless device (Block 74) and start monitoring the response time from the user (Block 76). The request will travel through an encrypted secure channel connecting the authorization server and the user's wireless device. Upon receiving the request, the wireless device 38 will notify the user and automatically display the request for the user. The user will have the opportunity to input the response through the wireless device 38 and be able to provide a PIN or personal digital signature (Block 78) as explained above. The PIN or digital signature along with the appropriate response parameters are sent back to the authorization server 24 through an encrypted secure channel via the secure wireless network 36.

Upon receiving the response from the wireless device 38, the authorization server will check if the response was received within a specified timeout period (Block 80) and verify the security credentials of the user and the wireless device (Block 82). In the event that the user does not respond to the request within the specified time limit, the authorization server 24 will respond to the third party with the appropriate response, either to deny the request or wait for the post-authorization model of FIG. 4 to take effect (Block 70). If the correct security credentials are provided, the specified instructions within the user's response will be executed by the authorization server. An appropriate response will be sent back to the third party (Block 64). Additional processing by the third party may be required to complete the transaction; otherwise the transaction would be completed by the authorization server. An optional acknowledgement can also be sent by the authorization server informing the user of the outcome of the request.

An alternative method of communicating the request in real-time is to have the authorization server initiate a connection to the wireless device. As previously described, the GUID for a wireless device may change and, therefore, the wireless device 38 must notify the authorization server when its GUID changes. Alternatively, another server can maintain the current list of active wireless devices and their identifiers. The wireless device must be able to detect that its GUID has changed and be able to communicate this information to the authorization server securely. This can be achieved with the use of a daemon application running in the background polling the GUID for changes or it can be triggered as an event when a new GUID is obtained. For GUIDs that rarely change, such as SMS numbers, they can be pre-registered using external means, such as by registration on a website or through a customer service representative of the authorization server entity.

Figure 6:
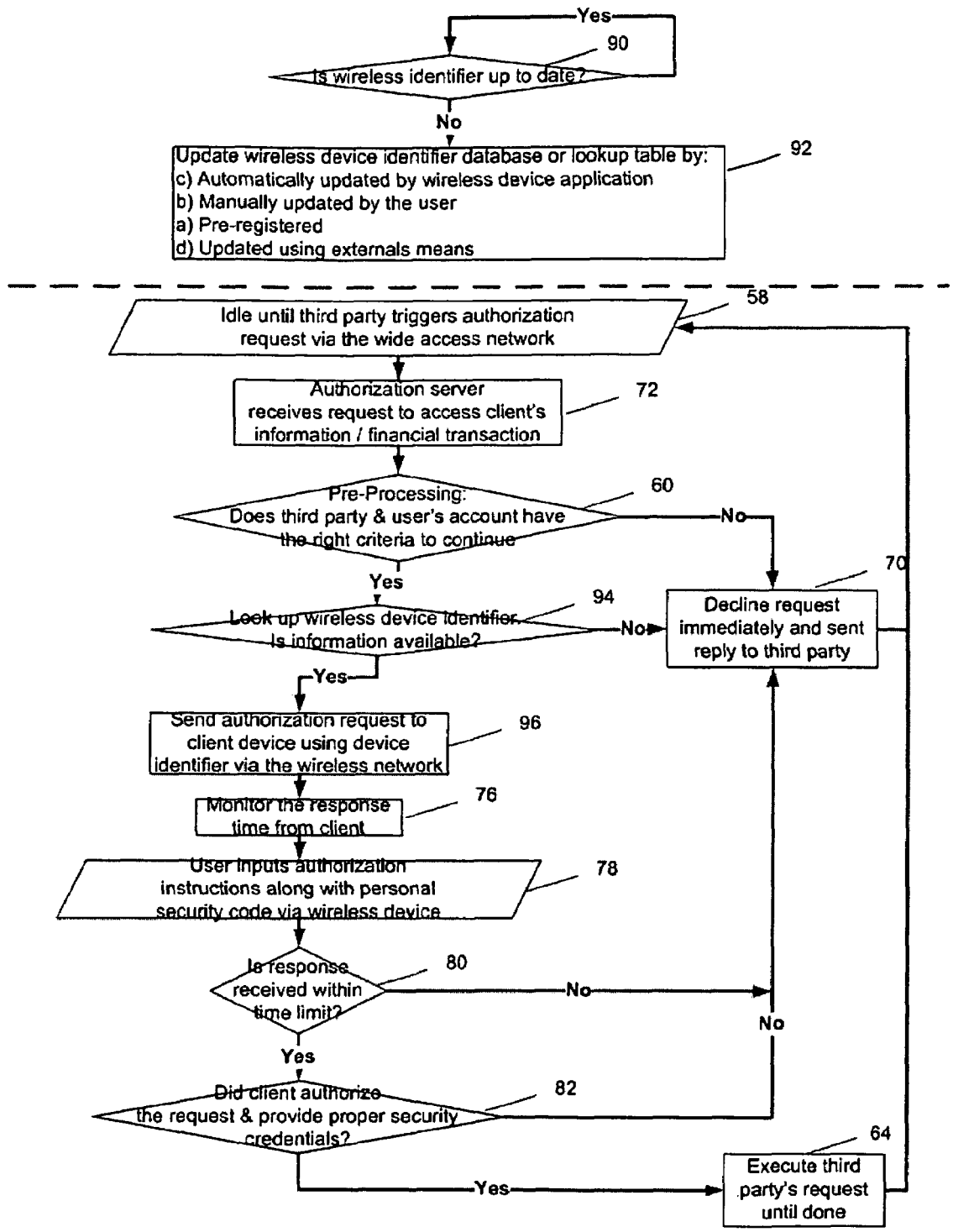
FIG. 6 is a flow diagram which illustrates the steps for an authorization server initiated, real-time authorization model.

FIG. 6 shows the flow chart of the real-time authorization model, with the authorization server initiating the connection. This model is also similar to the basic real-time authorization model of FIG. 3, except that it requires the authorization server to check status of the wireless identifier (Block 90) and, if necessary, update the identifier prior to the third party's request (Block 92). When the third party sends an authorization request to the authorization server via the wide access network 22 (Block 58), the request is received by the authorization server (Block 72). The authorization server will pre-process the information to determine if the user and the third party have the right criteria (Block 60). If pre-authorization has occurred, the authorization server will respond to the third party request immediately without further user intervention as discussed in previous section.

However, if no valid pre-authorization exists, the authorization server will look up the GUID of wireless device 38 and attempt to connect to the wireless device with the GUID obtained (Block 94). If the wireless device identifier is available, then the server 24 will send out an authorization request to the user's wireless device 38 (Block 96) and start monitoring the response time from the user (Block 76). The request will travel through an encrypted secure channel via wireless network 36 connecting the authorization server 24 and the user's wireless device 38.

Upon receiving the request, the wireless device 38 will notify the user and automatically display the request for the user. The user will have the opportunity to input the response through the wireless device and be able to provide a PIN or personal digital signature (Block 78). The PIN or digital signature along with the appropriate response parameters are sent back to the authorization server through an encrypted secure channel via the wireless network 36. Upon receiving the response from the wireless device, the authorization server 24 will check if the response was received within a specified timeout period (Block 80) and verify the security credentials of the user and the wireless device (Block 82). In the event that the user does not respond to the request within the specified time limit, the authorization server 24 will respond to the third party with the appropriate response, either to deny the request or wait for the post-authorization model to take effect (Block 70) as was described when referring to FIG. 4. If the correct security credentials are provided, the specified instructions within the user's response will be executed by the authorization server. An appropriate response will be sent back to the third party (Block 64). Additional processing by the third party may be required to complete the transaction; otherwise the transaction would be completed by the authorization server. An optional acknowledgement can also be sent by the authorization server informing the user of the outcome of the request.

The connections that are established between the authorization server 24 and the user's wireless device 38 in the pre-authorization, real-time authorization and post-authorization models are secured using encryption schemes. Using these security schemes to secure the connection provides the benefits of privacy, authentication, message integrity and non-repudiation. The preferred methods of security schemes used in our models are symmetric-key encryption and public-key encryption.

In using symmetric-key encryption to secure the connection, before the authorization begins, the user registers its GUID with the authorization server. Registering with the authorization server is not necessary if the user connects to the server first or if the pre-authorization model is supported. For the symmetric-key encryption scheme, the wireless device and the authorization server need to negotiate and agree upon a symmetric key before a transaction can take place. Any given symmetric key should be changed after a certain number of encryption cycles using the current key or after a certain amount of time has elapsed. In a compromised system, all the compromised keys need to be renegotiated. A similar key replacement process can be followed if the encryption keys are simply corrupted.

All transaction messages will have a unique sequence number to identify the specific transaction. This will assist in nullifying replay attacks. The user will also enter a PIN to authenticate himself or herself to the authorization server. The PIN or a hash of the PIN will be sent over the secure channel to be verified by the authorization server. As disclosed previously, this channel is encrypted by the pre-established symmetric key. The symmetric-key encryption scheme is ideal for communicating over a channel such as SMS/EMS/MMS. Improper encryption or an incorrect PIN would cause the transaction to be aborted. Alternatively, instead of sending the PIN information explicitly over the secure channel, it can instead be combined with the symmetric key to construct a new encryption symmetric key (symmetric#2). With this approach, this new key (symmetric#2) will be used to encrypt the channel instead.

In using a public-key encryption scheme such as Transport Layer Security (TLS), the symmetric-key mentioned in the previous section can be used as a device password (Device key). This is necessary if the wireless device 38 does not have its own certificate. While the authentication server 24 can be authenticated via its own certificate using the public and private keys, the wireless device 38 should be authenticated with a password scheme if a client certificate is not available on the device. Note that this is different from user authentication which takes place with the PIN. If the wireless device has a client certificate, then the Device key system can be abandoned. The PIN is still important since the user needs to be authenticated in case the wireless device is stolen. For example, the server certificate and the client certificate can be used to set up a TLS secure connection and the user can be authenticated using the PIN. Instead of sending the PIN over the secure connection, a hash of the PIN can be sent instead.

The precise TLS protocol will not be described in detail herein, since it is a well known protocol for those skilled in the art. However, it is important to note that the secure connection established in the public-key encryption approach uses the public key infrastructure to establish an encryption symmetric key to carry out the remainder of the transaction. TLS is one such protocol and other protocols can be used.

The authentication server 24 and the wireless device 38, if applicable, obtain their certificates from a Trusted Third Party (designated 34 in FIG. 1). Authentication using certificates is a well-known procedure and will not be discussed here. Certificate issues such as certificate revocation are also well documented. If a client certificate is available, digital signatures signed by the wireless device can be supported. In this case, the authorization server 24 will force each message sent from the wireless device 38 to be digitally signed with the wireless device's private key.

On the wireless device 38, proprietary software is used to send/receive messages to/from the authorization server. This software must handle various security schemes and communication channels. Once received, the user will be able to reply to the message. As mentioned before, the user will have to enter a PIN in order to carry out the transaction.

The timing of the transaction is also very important. Each message has an associated timeout period. If the response from the wireless device 38 comes after the timeout period, it becomes invalid. In this case, either the transaction will be aborted or a post timeout mechanism can be executed in the manner explained for the post-authorization scheme of FIG. 4.

It is important to restrict and prevent access of future and past messages by an attacker in case one of the symmetric-keys is compromised. To resolve this problem is to have a master secret key residing on both the wireless device and the authorization server. The master key should be stored within the secure storage of the device. In the event the device does not have secure storage, it should be encrypted with the PIN of the user. Periodically, new encryption session keys are renegotiated using a combination of the master secret key, random values generated by both the wireless device and the authorization server, and/or other known quantities, such as the previous session key. Being able to renegotiate the encryption symmetric-key, as described earlier for symmetric-key encryption, is important. Even if the current symmetric-key is compromised, without knowing the master secret key, the new symmetric-key will not be compromised.

In the event the master secret key is compromised, it can be reset and re-entered into the device. This is achieved by obtaining the master secret key outside of the disclosed wireless authorization system through phone, mail, and/or a secure web page and entering it manually into the application. The exact method for authenticating the user in this case is not part of this invention. The master secret key can be given to the customer during registration. During the renegotiation of the session key, each party generates a random value and sends it to the other party. After the new symmetric-key is derived independently by the two parties, they can communicate with each other to verify that they have the same key. This can be achieved by checking if the receiver can decrypt a test message that was encrypted by the sender with the new symmetric-key. Without knowing the master secret key, an attacker will not be able to derive the new symmetric-key.

Registration of the GUID should also be done over a secure channel. The user's PIN should not be required since it should happen seamlessly in the background without any interaction with the user. In the case where the registered GUID is incorrect or the registering process was carried by an attacker, the security of the system will not be absolutely compromised. Even if the messages are directed to the false destination, they will not be decrypted since the false destination will not have the encryption symmetric-key.

In order to protect the integrity of the application, it can be delivered to the customer through the secure channel during his or her initial registration process. Once the application is obtained, the customer is simply expected to follow the instructions and install it.

While the basic principles of this invention has been herein illustrated along with the embodiments shown, it will be appreciated by those skilled in the art that variations in the disclosed arrangement, both as to its details and the organization of such details, may be made without departing from the spirit and scope thereof. Accordingly, it is intended that the foregoing disclosure and the showings made in the drawings will be considered only as illustrative of the principles of the invention, and not construed in a limiting sense.

We claim:

1. A secure wireless authorization system to enable a user to communicate with an authorization server by way of a secure wireless connection to authorize a particular action associated with a request for authorization initiated by a remote entity and processed by the authorization server, said system comprising:

an authorization server linked to the remote entity by means of a communications connection;

a wireless device of the user to enable the user to send to and receive from said authorization server the request for authorization and to provide to said authorization server a secure authorization in response to the request for authorization processed by the authorization server in order to cause the remote entity to take the particular action, said wireless device adapted to securely store means for encryption, means to create said secure authorization, and means to establish the secure wireless connection depending upon the request for authorization and the stored encryption means; and a secure wireless connection initiated by the wireless device of the user to the authorization server or by the authorization server to the wireless device of the user over which to transmit said secure authorization from said wireless device to said authorization server, wherein the secure wireless connection between the wireless device of the user and the authorization server and the communication connection linking the authorization server with the remote entity are operated independently of one another, and wherein the user authorizes a remote entity transaction request for completing the particular action in real time by means of said wireless authorization system according to a method comprising the steps of:

sending the remote entity transaction request from the remote entity to said authorization server by way of said communications connection;

pre-processing the remote entity transaction request at the authorization server to identify at least the user, the nature of the particular action to be authorized, and whether the user is qualified to authorize the action;

sending an authorization request from said authorization server to the wireless device of the user via said secure wireless connection following the transaction request sent to said authorization server by the remote entity and the pre-processing by the authorization server;

sending the user's response from the user's wireless device to said authorization server via said secure wireless connection;

executing the request by said authorization server if an approval response from the user is received; and sending a confirmation following the user's response from said authorization server to the remote entity.

2. The secure wireless authorization system recited in claim 1, wherein the communications network is a credit card network.

3. The secure wireless authorization system recited in claim 2, wherein the action to be taken following the receipt of the secure authorization by said authorization server is the approval of a credit card transaction.

4. The secure wireless authorization system recited in claim 2, wherein the remote entity is an on-line merchant.

5. The secure wireless authorization system recited in claim 2, wherein the remote entity is a credit card reader.

6. The secure wireless authorization system recited in claim 1, wherein the remote entity is a financial institution.

7. The secure wireless authorization system recited in claim 1, wherein the remote entity is a medical institution.

8. The secure wireless authorization system recited in claim 1, wherein the remote entity is another wireless device.

9. The secure wireless authorization system recited in claim 1, wherein said authorization server includes a database in which to store information associated with the user so that the request for authorization initiated by the remote entity will only be delivered to the wireless device of the user.

10. The secure wireless authorization system recited in claim 9, wherein said authorization server also stores a set of encryption keys by which to enable the secure authorization to be provided over said secure wireless network from the wireless device of the user to said authorization server.

11. The secure wireless authorization system recited in claim 1, wherein the means for encryption for creating the secure authorization response to be transmitted over said wireless connection between said authorization server and said wireless device of the user is symmetric-key encryption, and wherein said authorization server and said wireless device are responsive to the same symmetric key.

12. The secure wireless authorization system recited in claim 11, including a master secret key residing on said authorization server and said wireless devices of the user in order to change the symmetric key of said symmetric key encryption to which said authentication server and said wireless device of the user are user responsive.

13. The secure wireless authorization system recited in claim 1, wherein the means for encryption for creating the secure authorization to be transmitted over said wireless connection between said authorization server and said wireless device of the user is public-key encryption, and wherein said authorization server and said wireless device are responsive to a public and private key set.

14. The secure wireless authorization system recited in claim 1, further comprising a wireless gateway to interface said authorization server with said secure wireless connection so that the request for information sent by said authorization server will be received by the wireless device of the user and the secure authorization provided by the wireless device of the user in response to the request for authorization will be received by said authorization server.

15. A method for pre-authorizing a remote entity request to complete a transaction by means of the secure wireless authorization system recited in claim 1, said method comprising the steps of:
 entering a user's pre-authorization transaction information into said wireless device of the user regarding the transaction to be completed;
 sending the user's pre-authorization transaction information to said authorization server via said secure wireless connection prior to the remote entity request;
 storing the user's pre-authorization transaction information in said authorization server;
 sending the remote entity transaction request to said authorization server by way of said communications connection;
 determining in said authorization server whether the remote entity transaction request matches the user's pre-authorization transaction information; and
 executing the transaction if the remote entity transaction request matches the user's pre-authorization transaction information; and sending a confirmation to the remote entity once the execution is completed.

16. The method for a user to authorize a remote entity transaction request as recited in claim 1, wherein the approval response sent by the user is the user's personal digital signature entered into said wireless device of the user.

17. The method for a user to authorize a remote entity transaction request as recited in claim 1 wherein the approval response sent by the user is the user's personal identification number (PIN) entered into said wireless device of the user.

18. The method for a user to authorize a remote entity transaction request as recited in claim 1, wherein the approval response sent by the user is the user's digital certificate on said wireless device of the user.

19. The method for a user to authorize a remote entity transaction request as recited in claim 1, including the additional steps of keeping track in the authorization server the time required for the user to send his approval response following the sending of the authorization request, and denying the remote entity transaction request if the time tracked by the authorization server is greater than a pre-determined time.

20. The method for a user to post-authorize a remote entity transaction request as recited in claim 19, including the additional steps of sending the user's approval response and security credentials from the user's wireless device to the authorization server after said pre-determined time has elapsed, verifying in said authorization server the security credentials of the user, sending an acknowledgement to the remote entity that the third party transaction request has been accepted after said pre-determined time has elapsed provided that the security credentials are correct, executing the request by said authorization server, and sending a confirmation to said remote entity.

21. The method for a user to authorize a remote entity transaction request as recited in claim 1, including the additional step of initiating said secure wireless connection by the user's wireless device to the authorization server prior to the step of sending the remote entity transaction request to said authorization server.

22. The method for a user to authorize a remote entity transaction request as recited in claim 1, including the additional step of said authorization server initiating a secure wireless connection by identifying the GUID (global unique identifier) of said wireless device of the user and sending the authorization server transaction request to said wireless device of the user.

23. A method for a user to authorize a remote entity transaction request as recited in claim 22, including the additional step of said wireless device updating said authorization server with changes to said wireless device GUID.

24. The secure wireless authorization system recited in claim 1, wherein the secure wireless connection initiated by the said wireless device of the user to the said authorization server or by the said authorization server to the said wireless device of the user is a connection-oriented type connection or a connection-less type connection.

* * * * *